United States Patent [19]
Schmidt et al.

[11] Patent Number: 5,878,926
[45] Date of Patent: Mar. 9, 1999

[54] LIQUID BIOCIDE SPRAY ASSEMBLY

[75] Inventors: Bryan G. Schmidt, Waterford; Ronald A. Fair, Denair; Robert D. Baker, Riverbank, all of Calif.

[73] Assignee: Clark Pest Control, Inc., Lodi, Calif.

[21] Appl. No.: 862,999

[22] Filed: May 27, 1997

[51] Int. Cl.[6] .......................................................... B05B 3/18
[52] U.S. Cl. .......................... 239/745; 239/743; 239/722; 43/900
[58] Field of Search ...................................... 239/745, 754, 239/722, 14.2, 197, 195; 43/900

[56] References Cited

U.S. PATENT DOCUMENTS 5,489,066  2/1996  Oldham .................................... 239/745

Primary Examiner—Andres Kashnikow
Assistant Examiner—David Deal
Attorney, Agent, or Firm—Glen R. Grunewald

[57] ABSTRACT

An assembly for spraying a poultry house or the like with liquid biocide having a frame on which there is a spray manifold connectable to a biocide supply hose, the frame having a single front support in the form of a wheel or a skid and two rear supports in the form of skids, the frame being triangular and having lateral deflector plates mounted on its periphery.

6 Claims, 3 Drawing Sheets

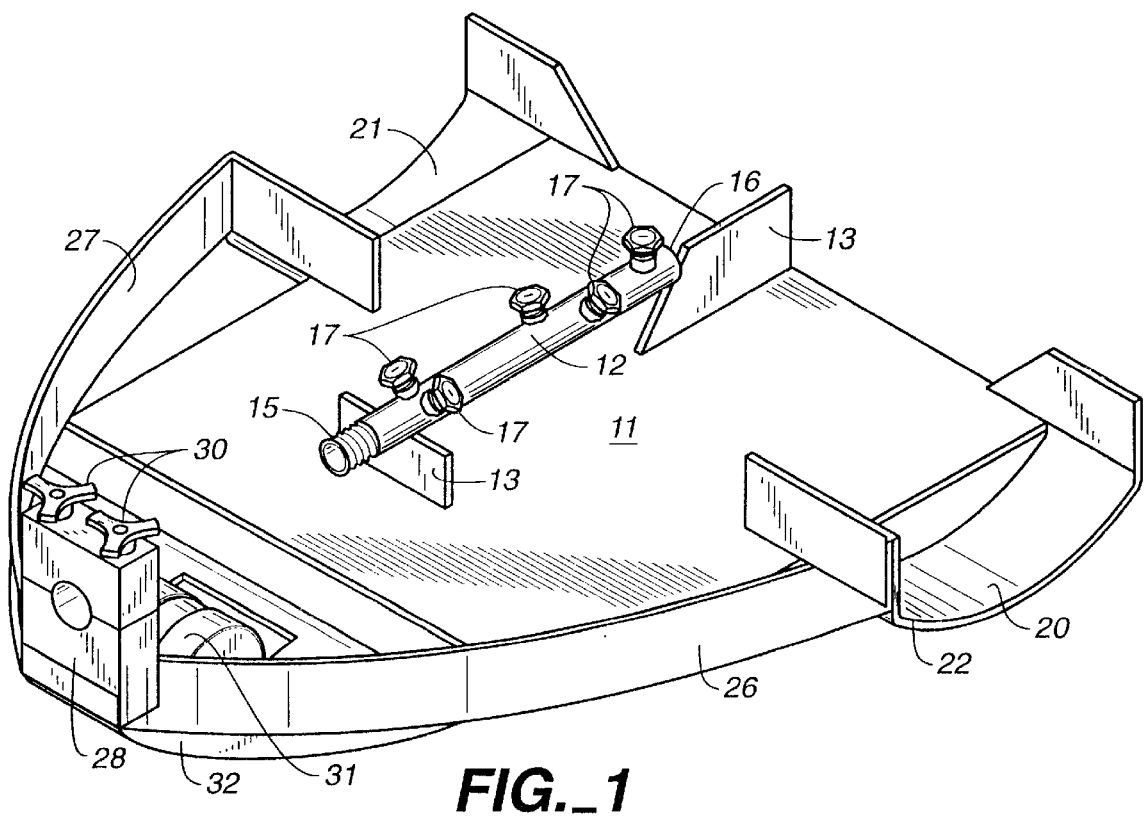
FIG._1
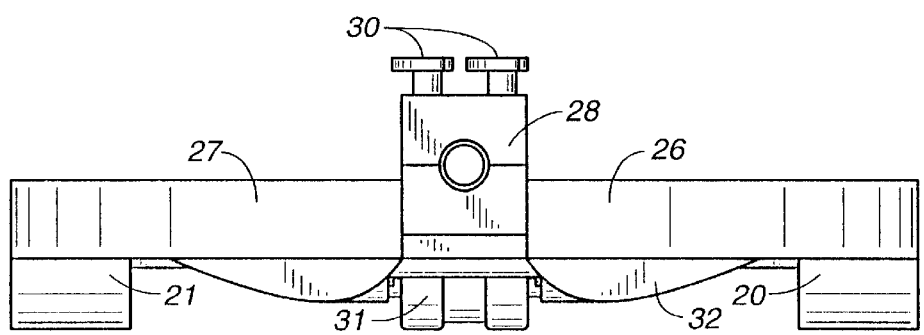
FIG._4

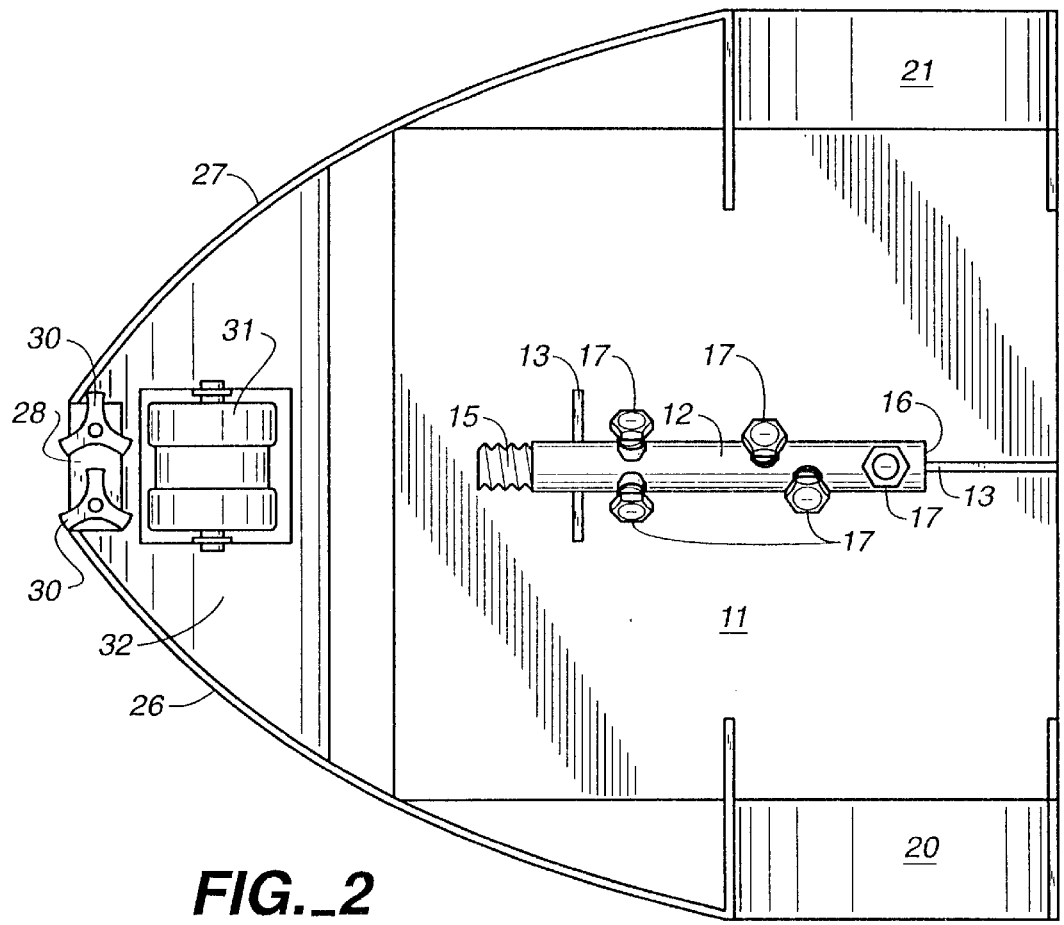
FIG._2
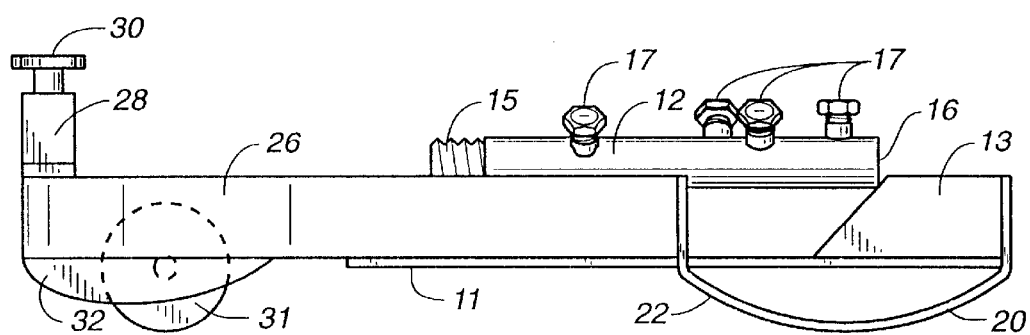
FIG._3

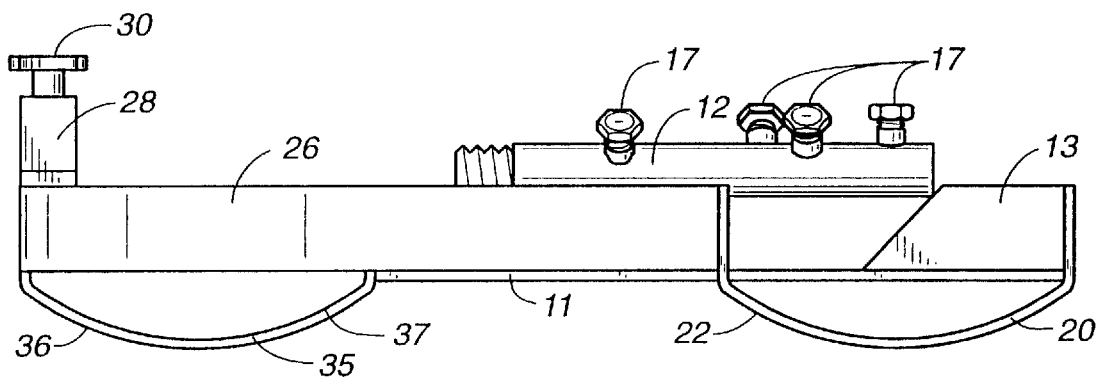
FIG._5
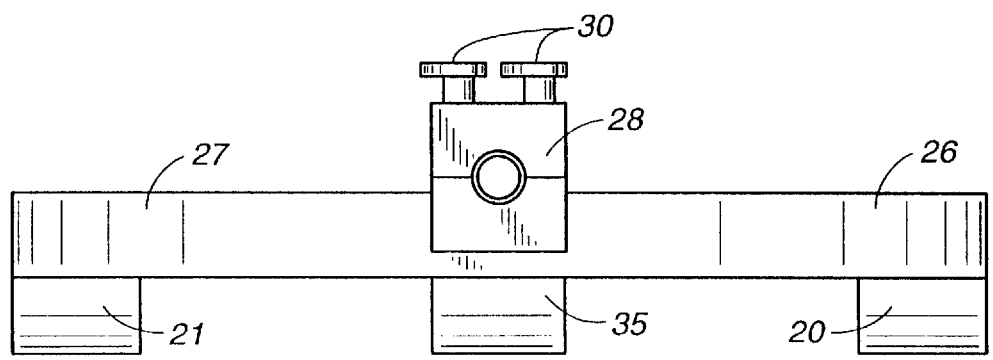
FIG._6

LIQUID BIOCIDE SPRAY ASSEMBLY

FIELD OF INVENTION

This invention is in the field of disinfecting enclosures such as poultry houses or barns by spraying the interior of such enclosures with a biocide.

BACKGROUND ART

Although this invention is not limited to disinfecting any particular enclosures, it is primarily useful to disinfect structures such as poultry houses. Poultry raised for food are grown in large, low silhouette houses. They are grown from hatchlings in the poultry house and removed only when it is time to slaughter and pack them for commerce.

When a poultry house is emptied of the poultry being grown there, it is necessary to clean it thoroughly and to treat it with a biocide. Manure is physically removed and the interior of the poultry house is cleaned with water and then disinfected by spraying its interior with a very strong and effective liquid biocide in a manner such that all surfaces within the poultry house are treated. One suitable biocide is an aqueous solution of formaldehyde and methanol. When the poultry house is sprayed, it must be isolated for a time sufficient for the biocide to dissipate. During the entire disinfecting procedure and until the biocide dissipates, personnel must not be exposed to the biocide. Although in the past personnel wearing protective clothing would literally enter the poultry houses to be disinfected and spray the interior by hand, government regulations and common sense have caused that practice to be discontinued.

One suitable apparatus for spraying the interior of a poultry house is described in U.S. Pat. No. 5,489,066 issued to Michael A. Oldham. The Oldham patent discloses a system which includes a spray vehicle on which a manifold having spray nozzles is mounted. The manifold is connected to a hose to supply biocide to the spray nozzles, and the hose is reeled onto a spool during the spraying procedure so that the vehicle is drawn through the poultry house to be sprayed from one end to the other whereby no personnel have to be within its interior during the spraying procedure.

When problems are encountered during the interior spraying of a poultry house, there is great difficulty involved in solving them. Personnel cannot enter the house for such simple tasks as moving a spray vehicle that got hung up on an interior column or to place it in its proper position if it veers off its intended path of travel through the house. Sometimes it is necessary to discontinue the spraying procedure and to let the biocide dissipate before the house can be entered which, of course, delays the disinfecting process so that the cycle of raising poultry is interrupted. The major problems encountered during a disinfecting procedure are that the spray vehicle gets caught on a column or other part of the structure or that it encounters a curb or the like on the floor of the house that it cannot be pulled over or that it veers off its intended path so that some portions of the interior of the poultry house gets sprayed more thoroughly than other portions. As mentioned in the Oldham patent, the vehicle must track properly as it is pulled through the poultry house if spraying is to be properly accomplished. The Oldham patent discloses a device that tracks accurately by having a sled or skid on the leading part of the vehicle and wheels on the back. In accordance with the Oldham disclosure, in order for a spray vehicle to track accurately it is necessary to have a sled at the leading part of the vehicle and wheels at the back.

SUMMARY OF THE INVENTION

This invention is a liquid biocide spray assembly that solves the above noted problems with assemblies used to spray a biocide liquid in the interior of poultry houses, barns, and the like. The assembly of this invention includes a spray manifold mounted on a frame and, as in the prior art, the manifold includes means connectable to a hose so that liquid biocide can be supplied to the manifold while the hose is wound on a reel whereby the hose pulls the assembly through a poultry house. In accordance with this invention the manifold is mounted on a frame which has a front side and a rear side, the hose being connected to the part of the manifold adjacent to the front side of the frame. The front side of the frame is supported by a support means such as a wheel or a skid, and the rear side of the frame is supported by at least two skids.

In a preferred embodiment, the assembly is roughly triangular with the point of the triangle at the front of the frame close to where the hose is attached to the manifold. The triangular shape is formed by at least one vertical fence-like element which diverges laterally from the front side of the frame toward the rear side to the lateral extent of the skids. In this preferred embodiment of the invention, if the assembly encounters an vertical interior support column or any other interior obstacle, it will be deflected laterally rather than being caught on the obstacle. It has been found that when the assembly of this invention is laterally deflected to avoid an obstacle, as soon as the assembly has been drawn past that obstacle it will return to its original path of travel so that complete spraying of a structure is obtained.

In another preferred embodiment of the invention, where the front support means is a wheel, the frame has a deflection plate on its underside that extends forward of the wheel and upwardly toward the front of the frame. This plate deflects the frame upwardly from the floor when a horizontal obstacle is encountered and thereby avoids the device of this invention from getting caught on horizontal obstacles such as curbs, pieces of lumber or mounds of earth. When the front support means is a skid, its leading portion is normally bent upwardly and no additional deflection plate is required. It has been found that when the assembly of this invention is deflected either laterally or vertically by some obstacle, the combined effect of the single forward support means and the plural rear skids cause the frame to be drawn back on its original forward movement path. It has also been found that the combined effect of a support means in the form of a wheel or a skid in front and two or more skids in back causes the assembly of this invention to track accurately and reliably when drawn through a poultry house regardless of the type of floor over which it is drawn.

BRIEF DESCRIPTION OF THE DRAWINGS

FIG. 1 is a left perspective view of a spray assembly embodying this invention.

FIG. 2 is a top plan view of the assembly of FIG. 1.

FIG. 3 is a left-side elevation view of the assembly of FIG. 1.

FIG. 4 is a front elevation view of the assembly of FIG. 1.

FIG. 5 is a left-side elevation view of a different assembly embodying this invention.

FIG. 6 is a front elevation view of FIG. 5.

BEST MODE FOR CARRYING OUT THE INVENTION

The device of FIG. 1 includes a frame which is in the form of a plate 11 upon which is mounted a spray manifold 12 held by holding plates 13 which are welded to the plate 11 and to the manifold 12. The manifold includes a quick-connect and disconnect end portion 15 for connection to a hose and a closed end 16. Spray nozzles 17 are connected to the manifold 12 and these spray nozzles are designed to completely spray the interior of a structure through which the device is drawn. Spray nozzles of suitable construction are known to the art. Attached to plate 11 are skids 20 and 21, each of which has a raised forward portion as shown at 22 and 23. The frame is also provided with a side deflector plate 26 and a side deflector plate 27 which diverge laterally from the front to the rear of the plate 11 so they extend laterally at least as far as the lateral extent of skids 20 and 21. The forward portion of the frame is provided with a hose clamp 28 which includes screw-down locking means 30 so that a hose may be inserted into the hose clamp and tightened sufficiently for the device to be drawn through a poultry house by reeling in the hose. The hose is not shown. At the forward portion of the device of this invention, a wheel assembly 31 is mounted and the wheel assembly extends through an opening in a bottom deflector plate 32.

In the embodiment of FIGS. 5 and 6 the front support means is a single skid 35 that has a front upwardly curved portion 36 to deflect the assembly over horizontal obstacles and a rear upwardly curved portion 37 which is connected to plate 11 to provide a rigid structure. The embodiment of FIGS. 5 and 6 tracks when pulled through a poultry house by reeling a biocide supply hose and has the advantage of not having an axle when used in structures having sandy or loose dirt floors.

In use, the assemblies illustrated in the drawings are positioned outside of the poultry house to be sterilized at an opening wide enough to permit entry of the assembly. A hose, which is not shown, is connected to connector 15 and clamp 28 by screwing down the clamping means 30. The hose extends all the way through the poultry house to be sterilized and through a door where it is wrapped around a reel and connected to a tank containing liquid biocide which is provided with a pump for pumping the liquid biocide into the hose at sufficient pressure to operate the spray nozzles 17. When the connections are made, the biocide is supplied to the hose at sufficient pressure and it enters manifold 12 and sprays through nozzles 17 to completely cover all surfaces within the poultry house. As spraying proceeds, the hose is reeled onto a reel which causes the assembly of this invention to progress through the poultry house at the rate the hose is reeled. If the assembly of this invention encounters a vertical obstacle within the poultry house, such as a column or equipment that was inadvertently left within the poultry house, the side deflector plates 26 or 27 will encounter the vertical obstacle and cause the assembly of this invention to be pushed sideways whereby it will not become hung up on the vertical obstacle. The distance between the front ends of deflector plate 26 and deflector plate 27, will be occupied by the supply hose so that there is no portion at the forward end of the assembly to provide a point where the assembly could be caught or hung up by a vertical obstacle. It has been found that when the assembly of this invention is drawn past the vertical obstacle, the assembly moves back onto its original travel path, driven toward that path by the front support in the form of wheel 31 or skid 35 and the two skids 20 and 21 which provide alignment of the assembly that is axial with the direction of hose travel.

It has also been found that if the floor of the poultry house has mounds of loose material, stray pieces of lumber or curbs that the deflection plate 32 or front skid 35 causes the assembly to slide over such obstacles and the upturned forward portions 22 and 23 of the skids 20 and 21 cause the rear of the assembly to slide over those obstacles so that the assembly resumes its travel in its original direction of travel without interruption of its spraying function within the poultry house.

When the hose is wound enough on its reel for the assembly of this invention to have passed completely through the poultry house, the assembly may either be washed with water or permitted to stand exposed to the elements long enough for the biocide to dissipate, after which the assembly can be handled safely and placed in storage or in a transporting vehicle. Assemblies made in accordance with the illustrated embodiments are normally about 2–2½ feet across between the lateral extremes of skid 20 and 21 and about 2–3 feet long. They usually weigh about ten pounds so that they can be handled readily by one person. With appropriate nozzles 17 employed, a single spray assembly of this invention can disinfect a poultry house that is 60 feet wide and of any length. When the spray assembly of this invention is removed from the poultry house, the treated house is sealed and permitted to stand for at least 24 hours, after which it is completely disinfected and ready to be used again. It is evident that if the spraying of a poultry house is interrupted by having the spray assembly hung up within it by being caught on a vertical or a horizontal obstacle, current regulations require that the spraying must be discontinued and the assembly must remain in the house until the biocide has dissipated, a minimum of twenty four hours, and then the house must be sprayed again which causes expensive delays in the procedure of preparing a poultry house for a new batch of poultry.

We claim:

1. A liquid biocide spray assembly comprising a frame having a front side, a rear side, a top side and an under side;

a spray manifold mounted on said top side between said front side and said rear side, said manifold having means for connecting to a supply hose at the portion most closely adjacent to said front side and a spray nozzle;

a support means mounted on said frame to support said front side; and two skids mounted on said frame to support said rear side.

2. The assembly of claim 1 wherein said frame includes deflection means diverging laterally from said front side toward said rear side to the lateral extent of said skids.

3. The assembly of claim 1 wherein said support means comprises a wheel.

4. The assembly of claim 3 wherein said underside includes vertical deflection means extending forward of said wheel and biased downwardly from said front side toward said back side.

5. The assembly of claim 1 wherein said support means comprises a skid.

6. The assembly of claim 1 wherein said manifold includes a plurality of spray nozzles.

* * * * *